(12) United States Patent
Brown et al.

(10) Patent No.: US 10,024,311 B2
(45) Date of Patent: Jul. 17, 2018

(54) CRYOGENIC PUMP FOR LIQUEFIED NATURAL GAS

(71) Applicant: Caterpillar Inc., Peoria, IL (US)

(72) Inventors: Cory A. Brown, Peoria, IL (US); Adrienne M. Brasche, Peoria, IL (US); Daniel R. Baldwin, Peoria, IL (US); Sudhindra K. Ayanji, Edwards, IL (US); Joshua W. Steffen, El Paso, IL (US)

( * ) Notice: Subject to any disclaimer, the term of this patent is extended or adjusted under 35 U.S.C. 154(b) by 390 days.

(21) Appl. No.: 14/820,326

(22) Filed: Aug. 6, 2015

(65) Prior Publication Data
US 2017/0037836 A1   Feb. 9, 2017

(51) Int. Cl.
F04B 15/08 (2006.01)
F04B 23/02 (2006.01)
F04B 37/08 (2006.01)

(52) U.S. Cl.
CPC .......... F04B 15/08 (2013.01); F04B 23/021 (2013.01); *F04B 23/023* (2013.01); *F04B 37/08* (2013.01); *F04B 2015/081* (2013.01); *F17C 2227/0142* (2013.01); *F17C 2227/0178* (2013.01); *F17C 2265/066* (2013.01)

(58) Field of Classification Search
CPC .......... F04B 1/128; F04B 1/14; F04B 7/0076; F04B 9/109; F04B 9/117; F04B 9/1176; F04B 15/08; F04B 2015/081–2015/0826; F04B 43/067; F04B 43/073; F04B 53/14; F04B 53/146; F04B 53/148; F04B 49/22–49/225; F04B 19/22; F17C 2227/0135–2227/0142; F17C 2227/0178; F17C 7/02; F17C 2227/0185; F17C 2265/066

USPC ............ 417/400, 901; 62/50.6; 91/275, 327
See application file for complete search history.

(56) References Cited

U.S. PATENT DOCUMENTS

| 3,126,835 | A | * | 3/1964 | Kline | F04B 1/126 |
| | | | | | 123/43 A |
| 3,212,280 | A | * | 10/1965 | Thomas | F04B 7/0073 |
| | | | | | 417/520 |
| 3,431,744 | A | * | 3/1969 | Veilex | F04B 15/08 |
| | | | | | 417/554 |

(Continued)

FOREIGN PATENT DOCUMENTS

WO   8602900   5/1986

*Primary Examiner* — Alexander Comley
(74) *Attorney, Agent, or Firm* — Leydig, Voit & Mayer, LTD.

(57) ABSTRACT

A cryogenic pump for pumping liquefied natural gas (LNG) from a cryogenic tank storing LNG includes a drive assembly and a pump assembly disposed along a pump axis. The drive assembly includes a spool housing having a plurality of spool valves arranged around the pump axis, a tappet housing having a plurality of tappet bores with slidable tappets arranged around the pump axis, and spring housing including a plurality of movably disposed pushrods urged upward by a plurality of associated pushrod springs. Hydraulic fluid received by a hydraulic fluid inlet in the drive assembly is directed by the spool valves to the tappet bores to move the tappets downward against the pushrods. To collect the hydraulic fluid, the lowermost spring housing also includes a collection cavity formed therein that can return the hydraulic fluid to a hydraulic fluid outlet.

16 Claims, 7 Drawing Sheets

(56) References Cited

U.S. PATENT DOCUMENTS

| | | | | |
|---|---|---|---|---|
| 3,667,437 A * | 6/1972 | Dreisin | ............ | F02D 1/10 123/449 |
| 4,244,678 A * | 1/1981 | Uehara | ............ | F04B 49/002 417/218 |
| 4,443,160 A * | 4/1984 | Berthold | ............ | F04B 53/142 417/270 |
| 4,472,946 A * | 9/1984 | Zwick | ............ | F04B 41/02 222/385 |
| 4,576,557 A | 3/1986 | Pevzner | | |
| 4,619,589 A * | 10/1986 | Muller | ............ | F04B 43/067 417/388 |
| 4,792,289 A * | 12/1988 | Nieratschker | ............ | F04B 15/08 417/259 |
| 4,860,545 A * | 8/1989 | Zwick | ............ | F17C 9/00 222/385 |
| 4,915,602 A * | 4/1990 | Tschopp | ............ | F04B 15/06 417/503 |
| 5,024,584 A * | 6/1991 | Bordini | ............ | F04B 9/1378 417/342 |
| 5,411,374 A * | 5/1995 | Gram | ............ | F04B 15/06 141/18 |
| 5,545,015 A * | 8/1996 | Scherrer | ............ | F04B 15/08 417/360 |
| 5,575,626 A | 11/1996 | Brown et al. | | |
| 5,819,544 A * | 10/1998 | Andonian | ............ | F04B 15/08 62/50.2 |
| 5,860,798 A | 1/1999 | Tschopp | | |
| 5,879,137 A * | 3/1999 | Yie | ............ | F04B 1/124 137/624.13 |
| 6,006,525 A * | 12/1999 | Tyree, Jr. | ............ | F04B 3/003 62/239 |
| 6,102,676 A * | 8/2000 | DiCarlo | ............ | F04B 5/02 417/460 |
| 6,264,437 B1 * | 7/2001 | Porel | ............ | F02M 59/04 105/96.1 |
| 6,354,088 B1 * | 3/2002 | Emmer | ............ | F17C 5/007 141/82 |
| 6,481,218 B1 | 11/2002 | Drelser | | |
| 6,663,350 B2 | 12/2003 | Tyree, Jr. | | |
| 7,293,418 B2 * | 11/2007 | Noble | ............ | F17C 3/08 62/50.1 |
| 7,356,996 B2 * | 4/2008 | Brook | ............ | F17C 3/08 417/901 |
| 7,637,113 B2 * | 12/2009 | Batenburg | ............ | F04B 9/105 417/211.5 |
| 7,913,496 B2 * | 3/2011 | Batenburg | ............ | F04B 9/105 417/63 |
| 8,671,700 B2 | 3/2014 | Duong et al. | | |
| 2004/0187957 A1 * | 9/2004 | Scheeter, Jr. | ............ | F17C 7/02 141/86 |
| 2005/0016185 A1 * | 1/2005 | Emmer | ............ | F17C 5/007 62/50.1 |
| 2010/0180607 A1 * | 7/2010 | Duong | ............ | F04B 15/08 62/50.6 |
| 2014/0023530 A1 * | 1/2014 | Frey | ............ | F04B 9/117 417/375 |
| 2014/0109600 A1 * | 4/2014 | Lefevre | ............ | F04B 15/08 62/50.6 |
| 2014/0172269 A1 | 6/2014 | Perry | | |
| 2015/0276130 A1 * | 10/2015 | Hall | ............ | F17C 9/00 62/50.6 |
| 2016/0215766 A1 * | 7/2016 | Brown | ............ | F04B 9/109 |
| 2016/0281690 A1 * | 9/2016 | Coldren | ............ | F04B 1/12 |

* cited by examiner

CRYOGENIC PUMP FOR LIQUEFIED NATURAL GAS

TECHNICAL FIELD

This patent disclosure relates generally to a cryogenic pump for delivering liquefied natural gas to an internal combustion engine and, more particularly, to a hydraulic drive system for driving the cryogenic pump.

BACKGROUND

Many large mobile and/or stationary machines such as mining trucks, locomotives, marine applications, pumps, compressors, generators, and the like have recently begun using alternative fuels, alone or in conjunction with traditional fuels, to power their internal combustion engines. An example of an alternative fuel is natural gas, which may be in the form of liquefied natural gas (LNG) or compressed natural gas (CNG), and which may provide cost and/or environmental advantages over more traditional fossil fuel sources. Because natural gas is in a highly voluminous and gaseous phase under normal environmental conditions, the natural gas is typically converted into a highly compressed state or condensed into a liquefied phase to simplify handling, transportation, and storage. The conversion of natural gas to these compressed or liquefied forms requires that the natural gas be maintained in a highly pressurized state at cryogenically low temperatures, for example, on the order of −160° C.

To store and utilize cooled natural gas in compressed or liquefied forms onboard mobile machines, specialized storage tanks and fuel delivery systems are required. This equipment may include a double-walled cryogenic tank and a pump for delivering the LNG or CNG to the internal combustion engine for combustion. The pump may be specially configured to maintain the cryogenic temperatures within the tank so that the LNG does not prematurely evaporate. One example of a cryogenic pump for pumping cryogenic fluids such as LNG from a cryogenic tank is described in co-pending U.S. Pat. No. 6,481,218 ("the '218 application") titled Pump System for Delivering Cryogenic Liquids and assigned Linde Gas Aktiengesellschaft. The '218 patent describes a plurality of pumping elements that can be disposed in a container communicating with a storage tank that can receive cryogenic liquids. The pumping elements can be activated in a reciprocal manner to deliver the cryogenic liquid to an application while maintaining the liquid state. In an embodiment, the '218 application describes that the cryogenic liquid may be used as a fuel source. The present disclosure is also directed to a cryogenic pump for delivering a cryogenic liquids from a storage to an application.

SUMMARY

The disclosure describes, in one aspect, a cryogenic pump for pumping liquefied natural gas from a cryogenic tank to an internal combustion engine. The cryogenic pump may have a pump assembly submersed within a cryogenic tank storing liquefied natural gas and a drive assembly configured to hydraulically drive the pump assembly to pump the liquefied natural gas from the tank. The cryogenic pump may further include a connecting rod housing extending between the drive assembly and the pump assembly to define a pump axis. The drive assembly of the cryogenic pump further includes a spool housing having a plurality of spool valves disposed therein concentrically about the pump axis with each of the spool valves in fluid communication with a high-pressure hydraulic fluid supply. The drive assembly further includes a tappet housing having a plurality of tappet bores, each including a slidable tappet, also concentrically arranged about the pump axis with each bore in fluid communication with one of the plurality of spool valves. The drive end also includes a spring housing having a collection cavity for collecting hydraulic fluid from the tappet bores and accommodating a plurality of pushrod springs. To conduct axially motion through the cryogenic pump, a plurality of pushrods extend through the spring housing each with a first end projecting into a tappet bore to contact a tappet and with a second end projecting through a pushrod aperture disposed in a spring housing floor to contact at least one of the connecting rods. The pushrods are operatively associated with a pushrod spring in the spring housing to normally urge the first end into the tappet bore.

The disclosure further describes a method for operating a cryogenic pump to deliver liquefied natural gas from a cryogenic tank to an internal combustion engine. The method involves a cryogenic pump having a drive assembly and a pump assembly located opposite the drive assembly to define a pump axis. According to the method, hydraulic fluid is received at a hydraulic fluid inlet disposed in the drive assembly the cryogenic pump from a high-pressure hydraulic fluid supply in fluid communication with the hydraulic fluid inlet. Spool valves are then actuated to direct hydraulic fluid from the hydraulic fluid inlet to a tappet bore also disposed in the drive assembly. The hydraulic fluid moves a tappet slidably disposed in the tappet bore against a pushrod partially disposed in a spring housing parallel to the pump axis and connected to a reciprocal plunger disposed in the pump assembly of the cryogenic pump. According to the method, hydraulic fluid is collected in a collection cavity disposed in the spring housing where it can be directed to a hydraulic fluid outlet in fluid communication with a hydraulic reservoir.

In yet another aspect, the disclosure further provides a liquefied natural gas (LNG) power system having a cryogenic tank for storing liquefied natural gas, an internal combustion engine operatively associated with the cryogenic tank for receiving liquefied natural gas, and a hydraulic system including a hydraulic pump and a hydraulic reservoir. The LNG power system also includes a cryogenic pump having a drive assembly and a pump assembly disposed along a pump axis with a plurality of connecting rods extending generally between the drive assembly and the pump assembly. The drive assembly further includes a hydraulic fluid inlet in fluid communication with the hydraulic pump and a hydraulic fluid outlet in fluid communication with the hydraulic fluid reservoir. The drive assembly of the cryogenic pump includes a spool housing, a tappet housing, and a spring housing. The spool housing has a plurality of spool valves in fluid communication with the hydraulic fluid inlet. The tappet housing is disposed axially underneath the spool housing and has a plurality of tappet bores operatively associated with one of the plurality of spool valves. Each tappet bore may include a tappet slidably disposed therein to urge against one of a plurality of pushrods. The spring housing can accommodate the plurality of pushrods and is disposed axially underneath the tappet housing. The spring housing further includes a collection cavity in fluid communication with the plurality of tappet bores of the tappet housing to direct hydraulic fluid to the hydraulic fluid outlet.

DETAILED DESCRIPTION

Figure 1:
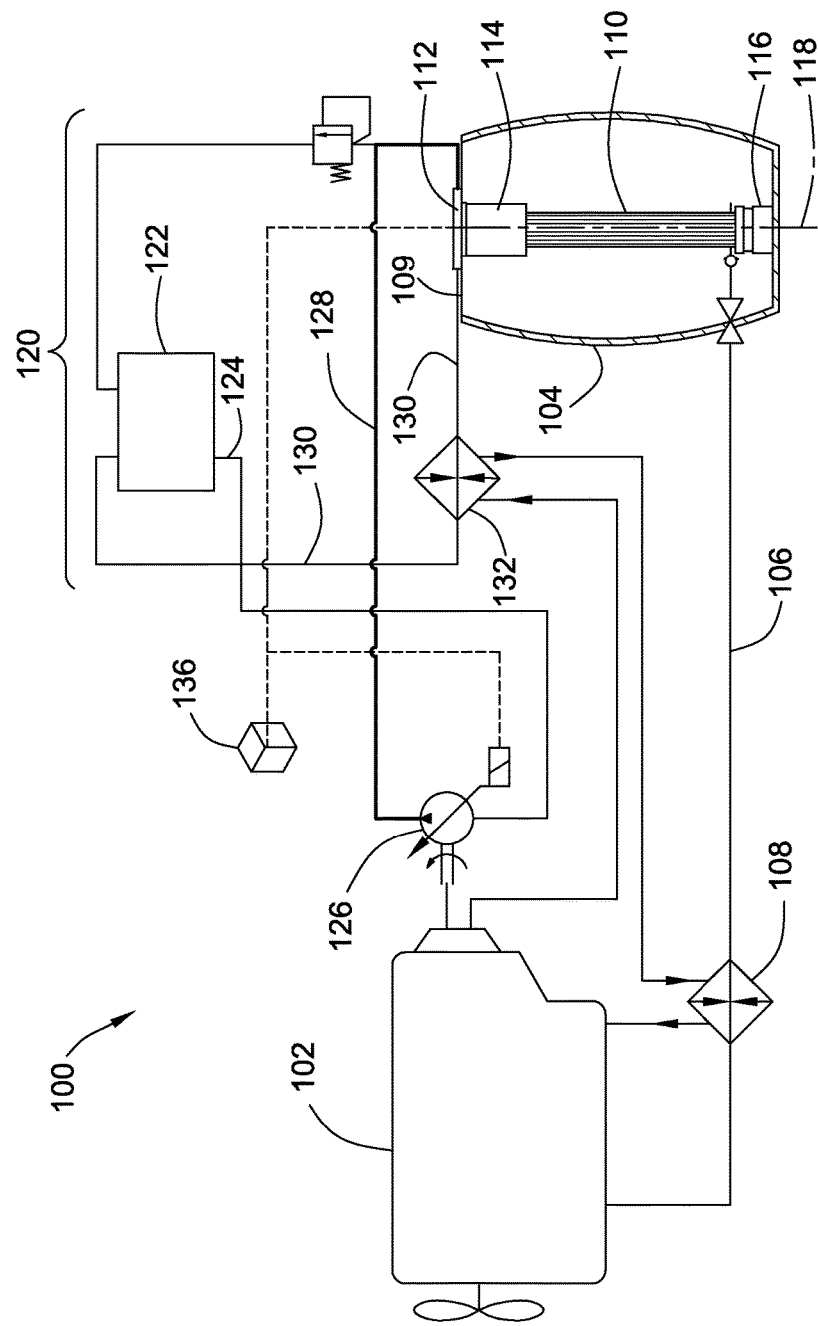
FIG. 1 is a schematic block diagram representative of a liquefied natural gas (LNG) power system wherein LNG is directed from a cryogenic tank by a cryogenic pump to an internal combustion engine for combustion.

This disclosure relates to mobile or stationary machines that combust compressed natural gas (CNG) or liquefied natural gas (LNG), maintained at cryogenic temperatures, in an internal combustion engine for power. Referring to FIG. 1, wherein like reference numbers refers to like elements, there is illustrated a representative schematic diagram of an LNG power system 100 for combusting and converting LNG to motive power for the machine. The machine may be any various type of machine for performing some type of works in an industry such as mining, construction, farming, transportation, or any other industry known in the art. For example, the machine may be an earth-moving machine, such as a wheel loader, excavator, dump truck, backhoe, motor grader, material handler, mining truck, or the like. In other embodiments, the machine may be a stationary machine for powering pumps, compressors, generators, or the like. The foregoing uses of the LNG power system 100 are representative only and should not be considered a limitation on the claims of the present disclosure. The described LNG power system 100 may, in the alternative, operate on CNG.

The LNG power system 100 can include an internal combustion engine 102 that can receive LNG fuel from a cryogenic tank 104 that may be located on or in close proximity to the machine. The internal combustion engine 102 can include pistons, cylinders, an air mass flow system and other components operably arranged to combust LNG and covert the chemical energy therein into a mechanical motive force through a common internal combustion process as is known in the art. However, in other embodiments, the internal combustion engine may be replaced with a different type of combustion engine such as a turbine. To communicate LNG from the cryogenic tank 104 to the internal combustion engine 102, the LNG power system 100 can include a fuel line 106 in the form of cryogenic hose or the like. In an embodiment, to facilitate the combustion process, the LNG may be converted back to a gaseous or vaporized phase prior to introduction to the internal combustion engine 102 by a vaporizer 108 disposed in the fuel line 106.

To store LNG in a liquid phase at cryogenic temperatures, the cryogenic tank 104 may be of a double-walled, vacuum-sealed construction like a Dewar flask or of a similar, heavily insulated construction and may be of any suitable size or storage volume. The cryogenic tank 104 therefore includes an exterior shell 109 that is exposed to the normal temperatures and pressures of the surrounding environment while enclosing the LNG therein at a cryogenic state. For example, the LNG may be maintained at temperatures of minus 160° C. or lower and at pressures of between about 100 kilopascals (kPa) to about 1700 kilopascals (kPa), however, other storage conditions may preside.

To direct the LNG from the cryogenic tank 104 to the internal combustion engine 102, a cryogenic pump 110 adapted for operation at cryogenic temperatures is partially disposed within the tank. In the illustrated embodiment, the cryogenic pump 110 is vertically arranged with respect to the cryogenic tank 104 with a pump flange 112 mounted to the top ceiling of the exterior shell 109. The cryogenic pump 110 can have an elongated shape to extend proximate to the bottom of the cryogenic tank 104. Because of the elongated shape, the cryogenic pump 110 has a drive assembly 114 associated with the pump flange 112 thermally connected to the exterior shell 109 that may be exposed to ambient atmospheric temperatures (known colloquially as the "warm end") and a pump assembly 116 disposed at the bottom of the cryogenic tank 104 and that may be submerged in cryogenic fluid such as LNG when the tank is full and exposed to the cryogenic temperatures of the LNG (known colloquially as the "cold end"). The cryogenic pump 110 further is characterized by a pump axis 118 extending between the spaced-apart drive assembly and pump assembly 114, 116 of the pump. When installed in the cryogenic tank 104, the pump axis 118 and the associated elongated extension of the pump may be vertically oriented, although in other embodiments other orientations of the cryogenic pump are possible. Furthermore, the elongated arrangement enables the pump assembly 116 to remain submerged as the LNG level falls in the cryogenic tank 104.

To drive the cryogenic pump 110, the drive assembly 114 may be configured as a hydraulic drive that is operatively associated with pumping elements disposed in the drive assembly 116. The drive assembly 114 may therefore be in fluid communication with a hydraulic system 120 that is associated with the LNG power system 100. To store hydraulic fluid, the hydraulic system 120 can included a hydraulic reservoir 122 of any suitable volume and that may normally maintain the hydraulic fluid near atmospheric pressure. For pressurizing and directing hydraulic fluid through the hydraulic system 120, a first hydraulic line 124 can establish communication between the hydraulic reservoir 122 and a hydraulic pump 126. The hydraulic pump 126 can be of any suitable construction and may be a metered or variable volume pump for adjustably controlling the quantity of hydraulic fluid directed through the hydraulic system. A second hydraulic line 128 can establish fluid communication between the outlet of the hydraulic pump 126 and the drive assembly 114 of the cryogenic pump 110. To return hydraulic fluid to the hydraulic system 120, a third hydraulic line 130 extends from the drive assembly 114 back to the hydraulic reservoir 122. The third hydraulic line 130 may also pass through a cooler 132 or heat exchanger after exiting the cryogenic pump 110 for cooling one or more fluids operatively associated with the internal combustion engine 102. In the embodiment illustrated in FIG. 1, the hydraulic reservoir 122 may be located at a higher relative elevation than the associated components of the hydraulic system 120 to assist in directing hydraulic fluid through the system.

To control the LNG power system 100 and/or the hydraulic system 120, an electronic controller 136 can be operatively associated with and in electronic communication with the components of the systems as indicated by the dashed lines. The controller 136 may be in the form of a microprocessor, an application specific integrated circuit (ASIC), or may include other appropriate circuitry and may have memory or other data storage capabilities. The controller 136 may also include or be capable of performing functions, steps, routines, data tables, data maps, charts and the like saved in and executable from read-only memory or another electronically accessible storage medium to control the LNG power system and/or hydraulic system. Although in the embodiment illustrated in FIG. 1, the controller is shown as a single, discrete unit, in other embodiments, the controller and its functions may be distributed among a plurality of distinct and separate components. The controller can also be operatively associated with various sensors, inputs, and controls arranged about the systems with electronic communication between components being established by communication lines such as wires, dedicated buses, and radio waves, using digital or analog signals.

Figure 2:
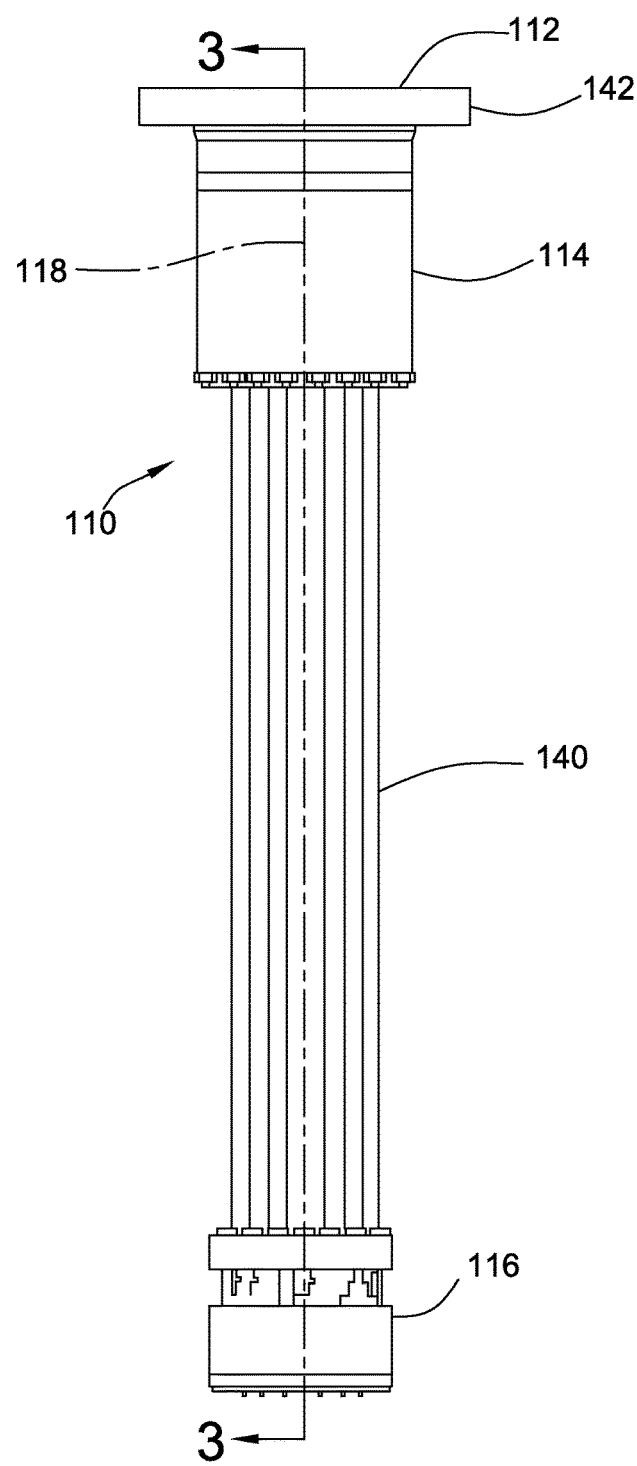
FIG. 2 is a side plan view of the cryogenic pump of FIG. 1 removed from the cryogenic tank with a hydraulic driven, upwardly located, drive assembly and a submersible, lower pump assembly vertically aligned along a pump axis.

Referring to FIG. 2, there is illustrated the cryogenic pump 110 having the drive assembly 114 extending downward from the pump flange 112 and the pump assembly 116 disposed for submersion in the LNG stored in the cryogenic tank. The cryogenic pump 110 can also include a connecting rod body 140 having an elongated, generally tubular shape extending between and interconnecting the drive assembly 114 and the pump assembly 116. The connecting rod body 140 can delineate the pump axis 118 that aligns with the vertical extension of the elongated cryogenic pump 110 when installed in the cryogenic tank. To support the cryogenic pump 110 as it depends downward into the cryogenic tank, the pump flange 112 includes a flange shoulder 142 protruding radially outward from the pump axis 118 and which can join to or rest atop the exterior shell of the tank. To enable operation at cryogenic temperatures, the exterior surfaces of the various components of the cryogenic pump can be made from any suitable material such as high-grade aluminum or stainless steel.

Figure 3:
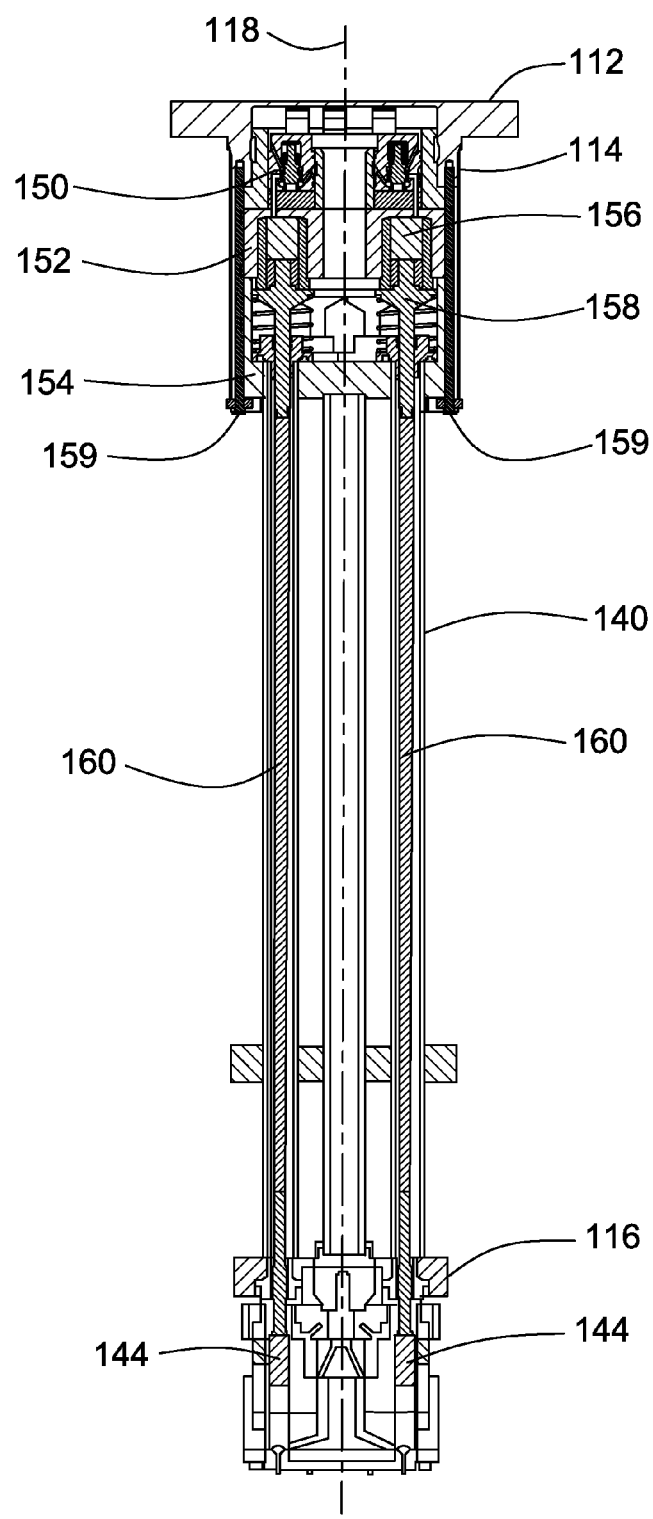
FIG. 3 is a cutaway, side plan view of the cryogenic pump taken along line 3-3 of FIG. 2 and illustrating the components of the upper drive assembly and the lower pump assembly.

Referring to FIG. 3, to pump LNG, the pump assembly 116 may include a plurality of pumping elements 144 in the form of reciprocal plungers adapted to move up and down with respect to the pump axis 118 and thereby generate a pumping action. The pumping elements 144 may move in a sequential and alternating manner to provide a consistent output of LNG from the cryogenic pump 110. In an embodiment, the pump assembly 116 may include six pumping elements 144 arranged concentrically about the pump axis 118, but in other embodiments, different numbers and arrangements of pumping elements are contemplated and fall within the scope of the disclosure.

To drive the pumping elements 144, the drive assembly 114 is configured as a hydraulic drive that converts the hydraulic pressure associated with the hydraulic fluid into reciprocal motion that is directed generally parallel with the pump axis. The conversion of hydraulic pressure to reciprocal motion is accomplished by interoperation of the components of the drive assembly 114. Those components may include an uppermost spool housing 150 located underneath the pump flange 112, a tappet housing 152 arranged vertically below the spool housing, and spring housing 154 disposed vertically below the tappet housing. The tappet housing 152 can include a plurality of tappets 156 slidably disposed and vertically movable therein and which abut a plurality of pushrods 158 partially accommodated in the spring housing 154. The pushrods 158 can depend below the spring housing 154 to abut against a respective number of connecting rods 160 that extend through the tubular connecting rod housing 140 from the drive assembly 114 to the pump assembly 116 and that are operatively associated with the pumping elements 144. Accordingly, when the tappets and pushrods are driven to reciprocate along the pump axis 118 by force of the hydraulic fluid, the connecting rods 160 transfer the up-and-down motion to the pumping elements 144. The different components of the drive assembly 114 may be secured together in vertical alignment by one or more threaded fasteners 159.

Figure 4:
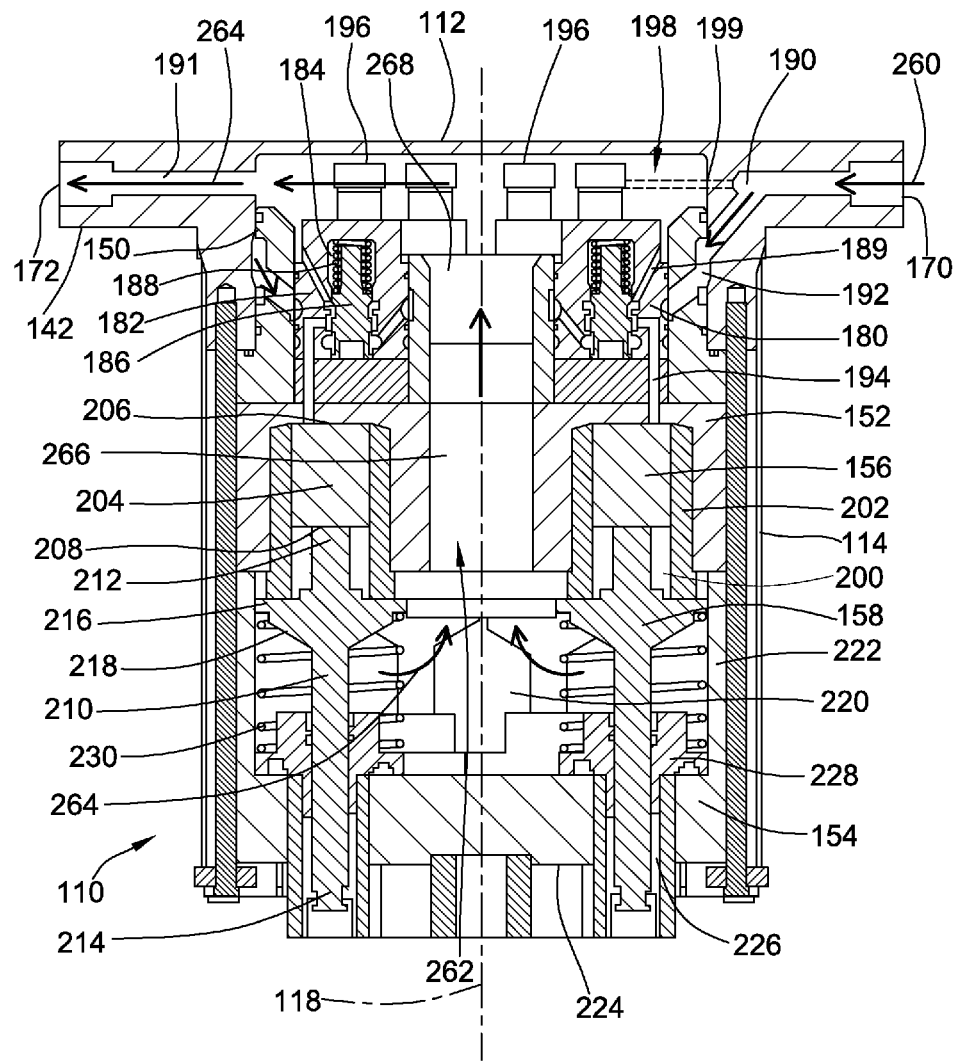
FIG. 4 is cutaway view of the drive assembly of the cryogenic pump detailing the arrangement of the internal components and illustrating by arrows the flow of hydraulic fluid inside and through the drive assembly.

Referring to FIG. 4, to receive and discharge hydraulic fluid, the drive assembly 114 of the cryogenic pump 110 includes a hydraulic fluid inlet 170 and a hydraulic fluid outlet 172 disposed into the flange shoulder 142 of the pump flange 112. The hydraulic fluid inlet 170 and the hydraulic fluid outlet 172 may be oriented perpendicular to the pump axis 118 and can be diametrically opposed to each other. The hydraulic fluid inlet 170 can receive pressurized hydraulic fluid from the hydraulic reservoir and hydraulic pump while the hydraulic fluid outlet 172 discharges and returns low-pressure hydraulic fluid back to the hydraulic system. Moreover, the hydraulic fluid inlet and outlet 170, 172 can be internally threaded to mate with threaded connectors or otherwise configured to enable fluid connection with the respective hydraulic lines of the hydraulic system.

To regulate flow of hydraulic fluid within the drive assembly 114, the spool housing 150 disposed under the pump flange 112 can accommodate a plurality of spool valves 180. As is known in the art, spool valves 180 are hydraulic valves for controlling the direction of flow of hydraulic fluid. Each spool valve 180 can include a valve body 182 delineating an internal spool bore 184 in which a shuttle valve or spool 186 is slidably accommodated. The spool 186 is reciprocally movable within the valve body 182 due in part to the influence of a spool spring 188 urging against or biasing the position of the spool. The valve body 182 can further have a plurality of passages disposed therein that can be selectively opened to or closed off from the spool bore 184 by controlled movement of the spool 186. As will be familiar to those of skill in the art, different arrangements of the passages in the valve body 182 will dictate operation of the spool valve 180, such as whether the spool valve is configured as a two-way valve, three-way valve, etc. The plurality of spool valves 180 can be arranged concentrically around or about the pump axis 118, with the direction of movement of the spools 186 in the spool bores 184 parallel to the pump axis. In the embodiments of the cryogenic pump 110 having six pumping elements 144, the spool housing 150 can include six spool valves 180 individually associated with and independently activating the pumping elements.

To direct the high-pressure hydraulic fluid to the spool valves 180, the pump flange 112 and the spool housing 150 can delineate a high-pressure circuit 190 composed of various fluid passages that channel hydraulic fluid from the hydraulic fluid inlet 170 to the spool valves. The pump flange 112 may also include a low-pressure circuit 191 that is similarly in fluid communication with the hydraulic fluid outlet 172. To circulate the incoming high-pressure hydraulic fluid to each of the plurality of spool valves 180, the high-pressure circuit 190 can include a high-pressure annulus 192 disposed circumferentially around the outside of the spool housing 150 which is in fluid communication with each of the individual spool valves. The spool housing 150 can further include a plurality of tappet passages 194 that establish fluid communication between the spool valves 180 and the tappet housing 152 below. The position of the spools 186 in the valve bodies 182 can be shifted to selectively establish fluid communication between the tappet passages 194 and either the high-pressure circuit 190 via the high-pressure annulus 192 or the low pressure circuit 191 to appropriately direct hydraulic fluid either downward to or upward from the tappet housing 152. It should be appreciated that the spool valves may be arranged to communicate with the tappet passages in configurations different than as illustrated in FIG. 4.

To actuate movement of the spools 186 within the valve bodies 182, and thereby selectively direct hydraulic fluid flow, each spool valve 180 can be operatively associated with one of a plurality of actuators 196. Each actuator 196 can be mounted on top of the valve body 182 and can project above the spool valve housing 150. To accommodate the top mounted actuators 196, there can be disposed in the pump flange 112, an actuator chamber 198. The actuator chamber 198 can collectively enclose the plurality of actuators 196 with the ceiling of the pump flange 112 extending overhead. In an embodiment, the actuators 196 can be solenoid-activated pilot valves that are in electrical communication with the controller of the LNG power system via wires disposed through the flange shoulder 142. When energized, the actuators 196 can open and close various pilot passages 199 disposed in the pump flange 112 and spool valve 180 to divert a small amount of high-pressure hydraulic fluid to and from valve bores 184. The pilot charge of hydraulic fluid can assist in moving the spools 186 to selectively direct high-pressure hydraulic fluid to and from the tappet passages 194. However, in other embodiments, the actuators 196 can include solenoid-operated plungers that connect directly to the spools 186 to cause movement of the spool within the spool bore 184.

When the spool valve 180 is actuated, the spool 186 moves upward in the spool housing 182 to open the tappet passage 194 to the high-pressure circuit 190 so the tappet housing 152 receives the high-pressure hydraulic fluid and utilizes it to slidably move the tappets 156 accommodated therein. To facilitate this, the tappet housing 152 can include a plurality of vertically arranged tappet bores 200 disposed therein and extending circumferentially around the pump axis 118, with the number of tappet bores corresponding to the number of tappets 156. Each tappet bore 200 may have a depth greater than the height of the tappets 156 to allow for vertical, up-and-down movement of the tappet within the bore, with the tappet passages 194 disposed into the tappet housing 152 and through the upward face of the tappet bores. To facilitate sliding movement of the tappets 156, a plurality of tappet guides 202 can be installed, one each, into the plurality of tappet bores 200 by press fitting or threaded connections, for example. The tappet guides 202 can be tubular shaped objects of appropriate low-friction material that are delineate the tappet bore 200 and are sized to make sliding contact with the tappets 156 inserted therein. In other embodiments, the tappet bores may be machined directly into the tappet housing 152.

The tappets 156 themselves may be cylindrical, piston-like objects having a cylindrical periphery 204 corresponding to the shape of the tappet bores 200 and first end face 206 and a second end face 208 that are substantially flat and that define the tappet height. When fully inserted into the tappet bores 200, the first end face 206 may abut against the top of the bore to block the tappet passage 194. The second end face 208 may face downward with respect to the vertical pump axis 118 and may be located at a position recessed into the tappet bore 200. Like the tappet bores 200, the tappets 156 installed therein are circumferentially arranged around the pump axis 118. It will be appreciated that the number of tappets 156 and the number of tappet bores 200 may correspond to the number of pumping elements in the pump assembly, for example, six.

Figure 5:
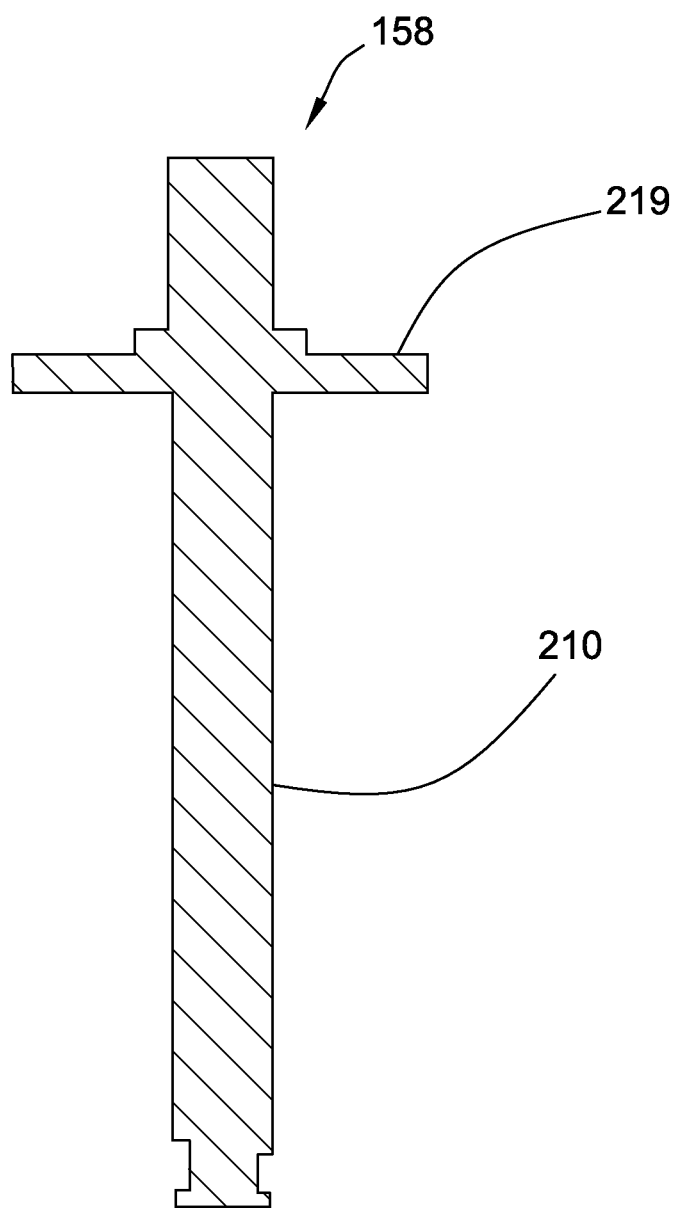
FIG. 5 is a side plan view of another embodiment of the pushrods having a disk-like rod flange.

The pushrods 158, which are accommodated in the spring housing 154 disposed below the tappet housing 152, can have an elongated rod extension 210, generally rod-like in shape and having a relatively small diameter, that extends between a first rod end 212 and a second rod end 214. The distance between the first and second rod ends 212, 214 can be dimensioned so that the first rod end projects upwardly into the tappet bore 200 while the second end protrudes through the spring housing 154. The pushrods 158 can also include a pushrod flange 216 extending outward from the rod extension 210 approximately a third of the way along the rod extension from the first rod end 212. In the illustrated embodiment, the pushrod flange 216 may have a lower chamfered face 218 that can be angled at approximately 45° with respect to the rod extension 210. However, referring briefly to FIG. 5, in other embodiments the pushrod flange 219 may have other shapes such as the flat, disk-like shape extending radially outwardly around the elongated rod extension 210 of the pushrod 158.

Referring back to FIG. 4, to accommodate the plurality of pushrods 158, the spring housing 154 can have disposed therein a collection cavity 220, or an enclosed space in which the pushrods are located. In the embodiment shown, the enclosed collection cavity 220 can be formed by peripheral wall 222 extending upwardly from a spring housing floor 224 and that circumscribes the pump axis 118. To enable the pushrods 158 to extend through the spring housing 154, the spring housing floor 224 can include a plurality of pushrod apertures 226 disposed therein and through which the second end 214 of the rod extension 210 can pass. The pushrod apertures 226 can be distributed circumferentially around the pump axis 118 radially outward toward the peripheral wall 222. The number of pushrods 158 accommodated in the spring housing 154 and, accordingly, the number of pushrod apertures 226 can be the same as the number of pumping elements in the pump assembly, for example, six. The collection cavity 220 can be sealed off from the pump assembly of the cryogenic pump by a plurality of pushrod seal assemblies 228 operatively associated with the pushrod apertures 226, which may include multiple parts to seal against, but enable sliding motion with respect to, the rod extensions 210.

To vertically position the plurality of pushrods 158 within the spring housing 154, a plurality of pushrod springs 230 can be disposed within the collection cavity and operatively associated with each of the pushrods. In particular, the pushrod springs 230 can be helical coil springs disposed between the pushrod flange 216 on the pushrod 158 and the spring housing floor 224 or, in the illustrated embodiment, the pushrod seal assembly 228 adjacent the spring housing floor 224. The pushrod springs 230 can be sized and have a spring constant configured to normally urge the pushrods 158 vertically upwards. In the vertically upward position, the first end 212 of the pushrod extends out of the spring housing 154 into the tappet bore 200 to contact the second end face 208 of the tappet 156 and urge the tappet upward into the tappet bore and possibly abutting against the tappet passage 194. Likewise, the second end 214 is partially refracted into the pushrod aperture 226. However, the pushrod springs 230 are compressible and can allow the pushrods 158 to move vertically downward with respect to the spring housing 154.

Figure 6:
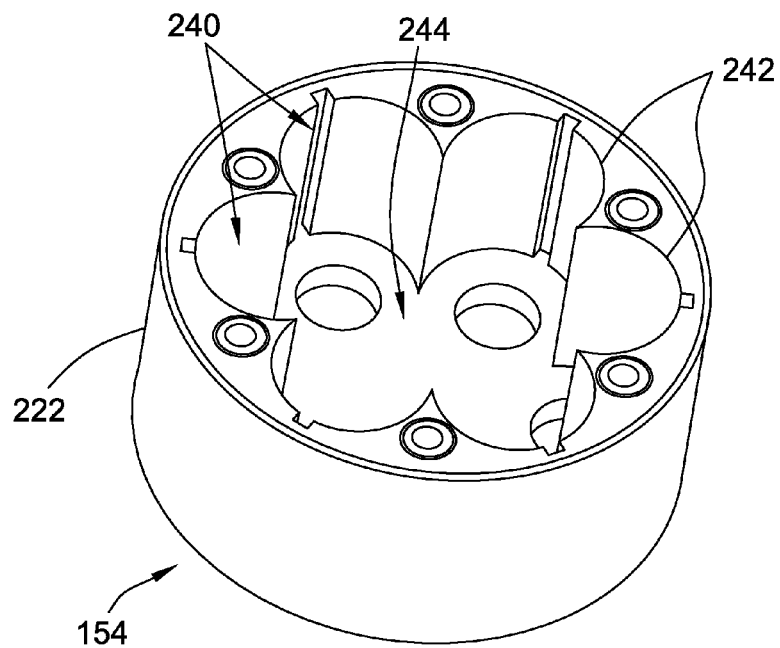
FIG. 6 is a top perspective view of an embodiment of the spring housing having a collection chamber formed in part by a plurality of partial bores and with an open central region.

The collection cavity 220 thereby delineates an interior space to accommodate and facilitate vertically movement of the pushrods 158 including the pushrod flanges 216 within the spring housing 154. Referring to FIG. 6, in an embodiment designed to assist alignment of the pushrods 158 within the spring housing 154, the peripheral wall 222 may include a plurality of partial bores 240 vertically disposed therein. The plurality of partial bores 240 can be radially spaced apart with respect to each other to form a series of semi-circular cutouts 242 along the interior surface of peripheral wall 222 that correspond in shape and dimension to the rod flanges of the pushrods. Accordingly, when the pushrods move up and down, the semi-circular cutouts 242 help maintain the radial position of the associated pushrods with respect to the pump axis and with respect to each other. In the embodiment illustrated in FIG. 6, the central region 244 of the collection cavity 220 is completely open space; however, in other embodiments the collection cavity can have a different configuration.

Figure 7:
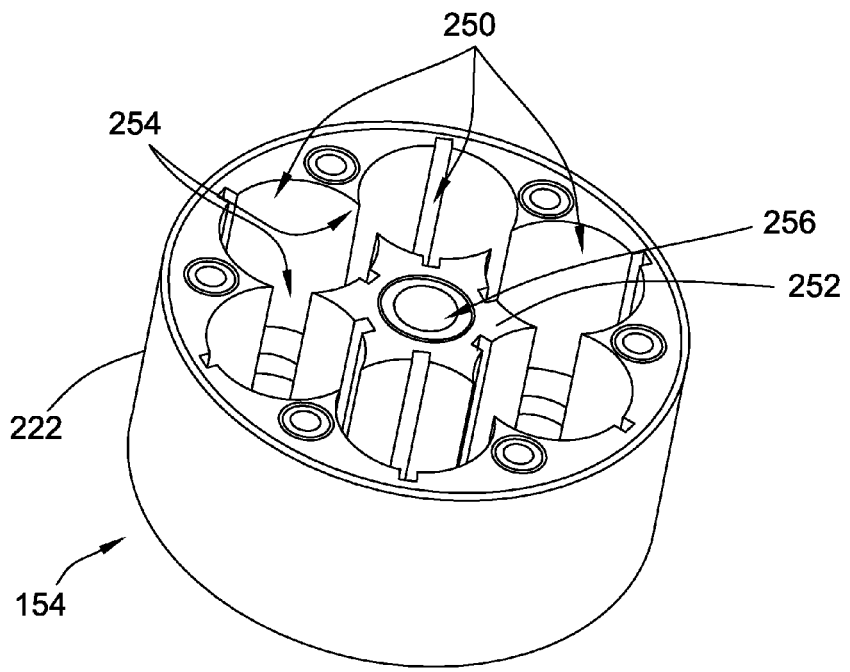
FIG. 7 is a top perspective view of another embodiment of the spring housing having a collection chamber formed in part by a plurality of cylindrical bores with a central post and channels interconnecting radially adjacent bores.

For example, referring to FIG. 7, the collection cavity 220 can be formed by a plurality of cylindrical bores 250 vertically disposed into the spring housing 154 and radially arranged circumferentially around the pump axis 118. Because of the cylindrical shape of the cylindrical bores 250, the center of the collection cavity 220 can include a central post 252 projecting upward from the spring housing floor 224 with a portion of the central post 252 helping to define the cylindrical shape of the bores. The cylindrical bores 250 can be sized to receive the rod flanges of the pushrods and therefore guide the vertical motion of the pushrods. In addition, each of the plurality of cylindrical bores 250 can accommodate one of the plurality of pushrod springs utilized to urge the pushrods vertically upwards. Moreover, the plurality cylindrical bores 250 can be radially spaced with respect to each other to intersect adjacent cylindrical bores and form channels 254 there between. The channels 254 interconnect the plurality of cylindrical bores 250 in a circumferential manner around the pump axis 118.

INDUSTRIAL APPLICABILITY

Referring to FIG. 4, the circulation through and utilization of hydraulic fluid in the cryogenic pump 110 will be described. High-pressure hydraulic fluid, such as oil, is received by the cryogenic pump 110 through the hydraulic fluid inlet 170 and is directed downwardly by the high-pressure circuit 190, as indicated by the arrows 260. The high-pressure hydraulic fluid is further distributed circumferentially about the spool housing 150 via the high-pressure annulus 192. Under operation of the electronic controller, individual actuators 196 may be actuated to further actuate the associated spool valves 180 between different positions in a suitable manner or pattern to direct hydraulic fluid through the cryogenic pump. For example, the plurality of spool valves 180 may be shifted to open the tappet passages 194 to the high-pressure circuit 190 one at a time in a sequential, clockwise pattern around the pump axis 118. However, in other embodiments, multiple spool valves can be opened and closed at the same time. Further, the duration and sequencing can be varied during operation depending upon the quantity of LNG needed by the combustion process.

When the spool valves 180 are appropriately positioned, high pressure hydraulic fluid is able to flow through the tappet passages 194 disposed in the tappet housing 152 into the tappet bores 200. The pressurized hydraulic fluid can urge and slide the tappets 156 vertically downward in the tappet bores 200 with respect to the pump axis 118. It will be appreciated that the downward motion of the tappets also causes the pushrods 158 associated with a particular tappet to move downward with respect to the spring housing 154 and compress the relative pushrod spring 230 against the spring housing floor 224 and pushrod seal assembly 228. Due to the connection between the pushrods and the connecting rods, it can be further appreciated that downward motion of a pushrod also causes the associated connecting rod to move similarly downwards, ultimately activating the pumping elements in the pump assembly causing them to direct LNG toward the internal combustion engine.

A particular tappet 156 can remain downwardly disposed in the tappet bore 200 so long as the associated spool valve 180 remains in a position directing high-pressure hydraulic fluid to the tappet passage 194. However, when the spool valve 180 is positioned to stop flow of high-pressured hydraulic fluid into the tappet passage 194 and instead allows fluid to drain from the tappet bore 200, the pushrod spring 230 can urge the pushrod 158 vertically back upwards and into the tappet bore thereby slidably moving the tappet 156 against the upward face of the tappet bores. Vertically upward movement of the pushrod 158 will also allow the associated connecting rod to move vertically upwards and disengage the pumping element in the pump assembly.

Motion of the tappet 156 upwards in the tappet bore 200 will displace the hydraulic fluid contained therein. A portion of that hydraulic fluid may be directed back up the respective tappet passage 194 and possibly into the spool valve 180 associated with the particular tappet passage and possibly back into actuator chamber 198 via a spool discharge passage 189. However, some hydraulic fluid may also flow downwardly between the tappets 156 and the associated tappet bores 200, notwithstanding the sliding contact between the tappets and the tappet guides 202. To retain hydraulic fluid in the drive assembly, the collection cavity 220 formed in the spring housing 154 is disposed underneath the tappet housing 152 with the bottoms of the tappet bores 200 exposed to the collection cavity. Moreover, because of the pushrod seal assemblies 228 associated with the pushrods apertures 226 disposed through the spring housing floor 224, the collection cavity 220 provides a sealed enclosure for accommodating the hydraulic fluid and preventing it from further leaking into the pump assembly or the cryogenic tank.

Because of the volume of the collection cavity and because the upstream spool valves may have shut closed, the pressure of the hydraulic fluid collecting in the collection cavity can be lower than the pressure of fluid present at the hydraulic fluid inlet 170. However, the repeated movement of the plurality of tappets and the continual discharge of hydraulic fluid into the collection cavity can cause the fluid pressure and fluid level in the collection cavity to rise, especially if the spool valves impede the discharge of hydraulic fluid upstream of the tappet bores. In various embodiments, hydraulic fluid can continue to collect in the collection cavity from the plurality of tappet bores until the cavity is full.

To remove the hydraulic fluid collected in the collection cavity 220, the drive assembly 114 can include a return path 262 that directs the hydraulic fluid upwardly and out of the collection cavity as indicated by arrows 264. The return path 262 can be formed in part by a tappet housing return bore 266 disposed in the tappet housing 152 and by a spool housing return bore 268 disposed in the spool housing 150 respectively. In the illustrated embodiment, the return path 262 is centrally aligned with the pump axis 118 but in other embodiments may be arranged differently within the drive assembly 114. The tappet housing return bore 266 and the spool housing return bore 268 can also communicate with the actuator chamber 198 formed in the pump flange 112 which in turn communicates with the hydraulic fluid outlet 172 via the low-pressure circuit 191. Accordingly, the continually rising low-pressure hydraulic fluid can flow vertically upward in the return path 262 through the actuator chamber 198 then outwardly from the drive assembly 114 via the low-pressure circuit 191 and the hydraulic fluid outlet 172. In such an embodiment, the return path 262 and the actuator chamber 198 may be submerged in a continuous flow of hydraulic fluid circulating through the drive assembly. Referring to FIG. 1, the hydraulic fluid discharged from the cryogenic pump 110 although lower in pressure than the hydraulic fluid received from the hydraulic pump 126, may still be at a pressure sufficient for return, via the third hydraulic line 130 and possible oil cooler 132, to the hydraulic reservoir 122 that may be elevated with respect to the cryogenic tank 104.

To encourage flow of hydraulic fluid up the return path 262, in a possible further embodiment of the cryogenic pump 110, the up and down motion of the plurality of tappets 156 may provide a low pressure pump helping to displace the fluid in the collection cavity 220. In particular, the downward motion of the tappet 156 displaces hydraulic fluid contained in the tappet bores 200 and in the collection cavity 220 up toward the actuator chamber 196. When the tappet 156 moves reciprocally upwards again, by for example, the action of pushrod springs 230, the tappets may discharge a volume of the hydraulic fluid back up the tappet passage 194 from the tappet bore 204 that was initially drawn into the tappet bore when the tappet moved down. However, a portion of the hydraulic fluid contained in the tappet bore 200 may pass downward between the tappet 156 and the tappet guides 202 and can fill into the now unoccupied lower volume of the tappet bore. When the tappet 156 is forced downward again during the next cycle, the hydraulic fluid from the lower portion of the tappet bore 204 is displaced into the collection cavity 200 and can increase the fluid pressure therein. In another sense, the up and down motion of the plurality of tappets 156 may cause a net transfer by volume of hydraulic fluid into the collection cavity 200. Hence, in this possible embodiment, the plurality of tappets may provide a low pressure pumping effect with respect to the hydraulic fluid in the drive assembly 114 of the cryogenic pump 110 in order to discharge the fluid from the drive assembly. In other embodiments, the up-and-downward motion may provide additional agitation of the hydraulic fluid in the collection cavity 200.

To facilitate continued flow of hydraulic fluid from the collection cavity 220 and out through the hydraulic fluid outlet 172, the drive assembly 114 can utilize the vertical motion of the pushrods 158. In particular, as each pushrod 158 moves up and down, the respective pushrod flanges 216 will be displaced within the collection cavity 220 that may be filled with hydraulic fluid. The motion of the pushrods 158 and pushrod flanges 216 will agitate the hydraulic fluid, causing it to circulate or move about the collection cavity and possibly up into the return path 262. Those embodiments of the pushrods 158 where the pushrod flange 216 includes a chamfered face 218 may further assist agitation of the hydraulic fluid. Agitation of the hydraulic fluid can advantageously prevent the formation of cold pockets within the fluid contained in the spring housing 154, especially proximate the spring housing floor 224, that may be in thermal communication with the pump assembly and/or cryogenic fluid contained in the cryogenic tank. The cold spots may cause hydraulic fluid to coalesce and to contaminate or interfere with the operation of the drive assembly 114, including the movable parts of the spool valves 180, tappets 156, and pushrods 158. In addition to agitation, the slow but continuous flow of hydraulic fluid from the tappet bores 200 into the collection cavity 220 and upwards along the direction of flow indicated by arrows 264 may advantageously thermally balance the drive assembly 114 of the cryogenic pump 110. In particular, the circulation of fluid may prevent the drive assembly 114 from becoming too cold while removing heat generated by the motion and friction of the internal components.

To further assist or improve agitation of the hydraulic fluid, the shape of the collection cavity formed into the spring housing can be designed to thoroughly circulate the fluid about the cavity. For example, referring to FIG. 6, the empty central region 244 in that embodiment of the spring housing 154 allows for hydraulic fluid to be discharged from the partial bores 240 disposed vertically along the peripheral wall 222 toward the center of the cavity by movement of the pushrods. In those embodiments where the return path for hydraulic fluid through the upper tappet housing and spool housing is aligned with the centrally located pump axis, the empty central region provides for substantially unobstructed flow into the return path. Referring to the embodiment of FIG. 7 having a vertical central post 252, the central post can include a vertically oriented, central bore 256 to accommodate and redirect the hydraulic flow upwards to the return path. The central bore 256 may receive fluid from openings in the central post 252 proximate the spring housing floor. Further, the channels 254 interconnecting the cylindrical bores 250 allows for hydraulic fluid to be displaced between adjacent bores as the pushrods are sequentially moved up and down. This means that the hydraulic fluid can be circulated in a clockwise or counterclockwise motion about the collection cavity and around the pump axis thereby further agitating the fluid. Such embodiments may ensure that the hydraulic fluid exiting the drive assembly of the cryogenic pump is at a pressure sufficient for return to the hydraulic reservoir.

Figure 8:
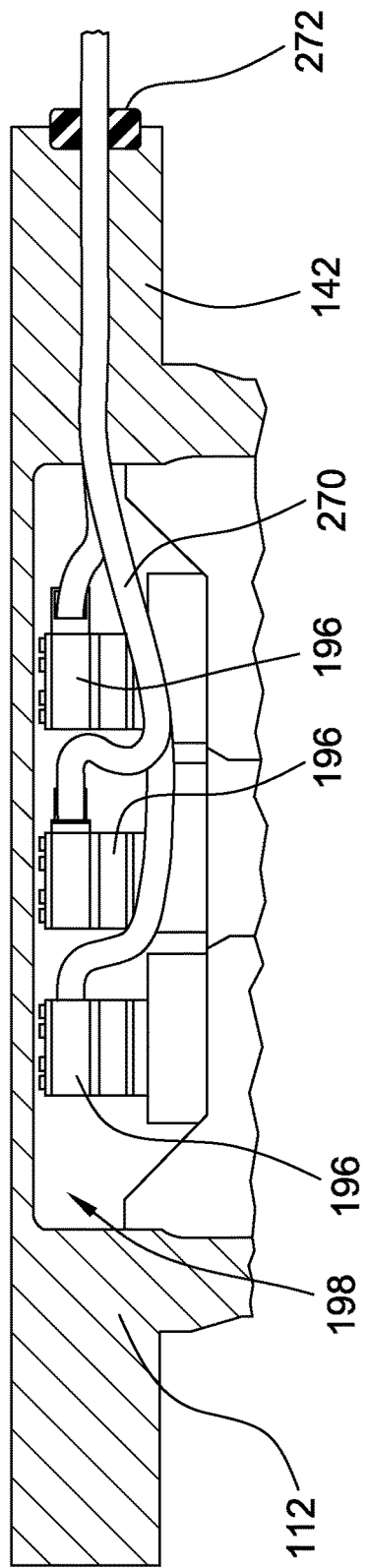
FIG. 8 is a cutaway, side elevational view showing an embodiment of the pump flange and the actuator chamber disposed therein with the plurality of actuators connected by molded shielded wires.

In addition to discharging hydraulic fluid from the collecting cavity, the hydraulic fluid outlet 172 may receive hydraulic fluid from other sources as well. For example, the spool valves 180 may be configured to bypass incoming hydraulic fluid from the hydraulic fluid inlet 170 to the actuator chamber 198, or to discharge a portion of the hydraulic fluid contained in the spool valves to the actuator chamber. Further, in those embodiments in which the actuators 196 receive a portion of the incoming hydraulic fluid from the pilot passages to actuate the spool valves 180, the actuators can also discharge that fluid back into the actuator chamber for removal from the drive assembly. Referring to FIG. 8, because the actuator chamber 198 disposed in the pump flange 112 may have a significant amount of hydraulic fluid flowing through it, the actuators 196 as electrical devices can be designed to operate in the presence of hydraulic fluid. For example, the actuators 196 can receive electrical power and control signals through one or more molded shielded wires 270 that can be disposed through the flange shoulder 142 of the pump flange 112 with a sealed bulkhead fitting 272 for electrical connection to the controller external of the pump. The molded shielded wires and bulkhead fitting prevent hydraulic fluid from contacting any individual wires or electrical connections in a manner possibly leading to an electrical short or otherwise interfering with the operation of the drive assembly 114.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A cryogenic pump for pumping liquefied natural gas from a cryogenic tank, the cryogenic pump comprising:
    a pump assembly adapted to be submersed within a cryogenic tank for storing liquefied natural gas;
    a drive assembly configured to hydraulically drive the pump assembly to pump liquefied natural gas from the cryogenic tank; and
    a connecting rod housing extending between the drive assembly and the pump assembly and accommodating a plurality of connecting rods, the connecting rod housing defining a pump axis;
    wherein the drive assembly further includes:
        a spool housing having a plurality of spool valves disposed therein concentrically arranged about the pump axis, the plurality of spool valves each in fluid communication with a high-pressure hydraulic fluid supply;
        a tappet housing including a plurality of tappet bores concentrically arranged about the pump axis, each tappet bore in fluid communication with one of the plurality of spool valves and having a tappet slidably disposed therein,
        a spring housing including a collection cavity for collecting hydraulic fluid from the tappet bores, the spring housing accommodating a plurality of pushrod springs in the collection cavity;
        a plurality of pushrods disposed through the spring housing, each of the plurality of pushrods including a first end projecting into a tappet bore and contacting a tappet and a second end projecting through a pushrod aperture disposed in a spring housing floor of the spring housing to contact at least one of the plurality of connecting rods, each of the plurality of pushrods operatively associated with a pushrod spring to urge the first end into the tappet bore.

2. The cryogenic pump of claim 1, wherein the drive assembly further includes a plurality of actuators each operatively associated with at least one of the plurality of spool valves.

3. The cryogenic pump of claim 2, wherein the drive assembly includes a pump flange disposed over the spool housing and having an actuator chamber therein to accommodate the plurality of actuators.

4. The cryogenic pump of claim 3, wherein the pump flange includes a hydraulic fluid inlet in fluid communication with the high-pressure hydraulic fluid supply, and a hydraulic fluid outlet in fluid communication with a hydraulic fluid reservoir.

5. The cryogenic pump of claim 4, wherein the pump flange includes a high-pressure circuit communicating hydraulic fluid from the hydraulic fluid inlet to the plurality of spool valves and a low-pressure circuit returning hydraulic fluid from the plurality of spool valves to the hydraulic fluid outlet.

6. The cryogenic pump of claim 5, wherein each of the plurality of actuators are electrically connected to an electrical controller by one or more molded shielded wires.

7. The cryogenic pump of claim 4, wherein the tappet housing includes a return path directing hydraulic fluid from the collection cavity to the hydraulic fluid outlet.

8. The cryogenic pump of claim 1, wherein the spring housing includes a peripheral wall protruding upward from the spring housing floor and surrounding the collection cavity.

9. The cryogenic pump of claim 8, wherein the collection cavity includes a plurality of cylindrical bores concentrically arranged about the pump axis with each cylindrical bore accommodating at least one of the plurality of pushrods and at least one of the plurality of pushrod springs, the plurality of cylindrical bores being in fluid communication with each other through a plurality of channels.

10. The cryogenic pump of claim 8, wherein the collection cavity includes a plurality of partial bores, each of the plurality of partial bores forming a semi-circular cutout into the peripheral wall of the spring housing.

11. The cryogenic pump of claim 1, wherein at least one of the plurality of pushrods includes a pushrod flange protruding radially outward from an elongated rod extension, the pushrod flange abutting at least one of the plurality of pushrod springs.

12. The cryogenic pump of claim 11, wherein the pushrod flange includes a chamfered face.

13. The cryogenic pump of claim 1, wherein the pump assembly includes a plurality of reciprocal plungers for pumping the liquefied natural gas.

14. A liquefied natural gas power system comprising
    a cryogenic tank for storing liquefied natural gas;
    an internal combustion engine operatively associated with the cryogenic tank for receiving liquefied natural gas;

a hydraulic system including a hydraulic pump and a hydraulic reservoir;

a cryogenic pump having a drive assembly and a pump assembly and a pump assembly disposed along a pump axis with a plurality of connecting rods extending generally between the drive assembly and the pump assembly, the drive assembly further including a hydraulic fluid inlet in fluid communication with the hydraulic pump and a hydraulic fluid outlet in fluid communication with the hydraulic fluid reservoir, a spool housing having a plurality of spool valves in fluid communication with the hydraulic fluid inlet, a tappet housing disposed axially underneath the spool housing and having a plurality of tappet bores each operatively associated with one of the plurality of spool valves and each with a tappet slidably disposed therein against one of a plurality of pushrods; and a spring housing accommodating the plurality of pushrods and disposed axially underneath the tappet housing, the spring housing including a collection cavity in fluid communication with the plurality of tappet bores and with the hydraulic fluid outlet.

15. The liquefied natural gas power system of claim 14, wherein the hydraulic reservoir is elevated above the cryogenic pump.

16. The liquefied natural gas power system of claim 14, wherein the spring housing accommodates a plurality of pushrod springs each associated with the one of the plurality of pushrods to urge each of the plurality of pushrods axially upward into the tappet housing.

* * * * *